(12) United States Patent
Marsolek

(10) Patent No.: US 9,879,386 B2
(45) Date of Patent: Jan. 30, 2018

(54) SYSTEM FOR COORDINATING MILLING AND PAVING MACHINES

(71) Applicant: Caterpillar Paving Products, Inc., Brooklyn Park, MN (US)

(72) Inventor: John Lee Marsolek, Watertown, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 26 days.

(21) Appl. No.: 14/965,618

(22) Filed: Dec. 10, 2015

(65) Prior Publication Data

US 2017/0167089 A1     Jun. 15, 2017

(51) Int. Cl.
*E01C 19/00* (2006.01)
*E01C 23/088* (2006.01)
*E01C 23/07* (2006.01)
*E01C 23/12* (2006.01)

(52) U.S. Cl.
CPC ............ *E01C 19/004* (2013.01); *E01C 19/00* (2013.01); *E01C 23/07* (2013.01); *E01C 23/088* (2013.01); *E01C 23/127* (2013.01)

(58) Field of Classification Search
CPC ........ E01C 23/07; E01C 19/00; E01C 23/088; E01C 23/127; E01C 19/004; G05D 1/293
See application file for complete search history.

(56) References Cited

U.S. PATENT DOCUMENTS

| 4,818,139 | A * | 4/1989 | Brock ........................ B60P 1/38 |
| | | | 404/104 |
| 5,921,708 | A * | 7/1999 | Grundl ..................... E01C 19/48 |
| | | | 180/168 |
| 7,549,821 | B2 | 6/2009 | Hall et al. |
| 7,946,787 | B2 | 5/2011 | Glee et al. |
| 8,099,218 | B2 | 1/2012 | Glee et al. |
| 9,011,038 | B2 | 4/2015 | Buschmann et al. |
| 2007/0150148 | A1 | 6/2007 | Rasmussen |

(Continued)

FOREIGN PATENT DOCUMENTS

WO     2013096144     6/2013

OTHER PUBLICATIONS

PCT International Search Report, International Application No. PCT/US2016/065364, dated Apr. 3, 2017.

*Primary Examiner* — Dale Moyer
(74) *Attorney, Agent, or Firm* — Finnegan, Henderson, Farabow, Garrett & Dunner, LLP

(57) ABSTRACT

A system for coordinating a cold planer and a paver is disclosed. The system may include a first sensor configured to generate a first signal indicative of a position of the cold planer; a production monitoring system associated with the cold planer and configured to determine a milling rate of the cold planer; a communication device configured to exchange information between the cold planer and the paver; and a controller. The controller may be configured to receive a second signal indicative of a position of the paver and a third signal indicative of a paving rate of the paver, determine a current distance between the cold planer and the paver based on the first and second signals, determine a target distance based on the current distance and a comparison of the milling rate and the paving rate, and determine a difference between the target distance and the current distance.

20 Claims, 3 Drawing Sheets

(56) References Cited

U.S. PATENT DOCUMENTS

| | | |
|---|---|---|
| 2010/0296867 A1 | 11/2010 | Buschmann et al. |
| 2012/0027514 A1 | 2/2012 | Hall |
| 2013/0076101 A1* | 3/2013 | Simon .................. E01C 23/088 299/39.2 |
| 2013/0189032 A1 | 7/2013 | Bellerose et al. |
| 2014/0097665 A1 | 4/2014 | Paulsen et al. |
| 2016/0170415 A1* | 6/2016 | Zahr .................... G05D 1/0293 701/23 |
| 2016/0348324 A1* | 12/2016 | Engelmann ........... E01C 23/088 |
| 2017/0058466 A1* | 3/2017 | Marsolek ................. G08G 1/20 |

\* cited by examiner

SYSTEM FOR COORDINATING MILLING AND PAVING MACHINES

TECHNICAL FIELD

The present disclosure relates generally to a control system and, more particularly, to a control system for coordinating milling and paving machines.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway during a resurfacing operation. A cold planer typically includes a frame propelled by tracked or wheeled drive units. The frame supports an engine, an operator's station, a milling drum, and conveyors. The milling drum, fitted with cutting bits, is rotated through a suitable interface with the engine to break up the surface of the roadway. The broken up roadway material is deposited by the milling drum onto the conveyors, which transfer the broken up material into haul trucks for removal from the worksite. A paving machine follows behind the cold planer at a desired distance and covers the milled surface with fresh asphalt. Haul trucks carrying fresh, hot asphalt from a plant periodically pass between the paving machine and the cold planer to deliver additional asphalt to the paving machine. This process repeats until the resurfacing operation is finished.

After its production, fresh asphalt gradually cools until it is eventually laid onto the milled roadway surface. If too much time passes between its production and its use on the roadway, the fresh asphalt can cool to temperatures at which it becomes brittle and unworkable. Thus, supervisors of a resurfacing operation may wish to coordinate deliveries of fresh asphalt with actual rates of asphalt usage by the paving machine to minimize cooling time and wasted asphalt. However, when the cold planer ahead of the paving machine stops during operation, such as to wait for an empty haul truck or when cutting bits on its milling drum need replaced, the paving machine may be required to slow or stop its operations, during which time the fresh asphalt may fall below its usable temperature.

One attempt to coordinate milling and paving operations is disclosed in U.S. Pat. No. 7,549,821 B2 that issued to Hall et al. on Jun. 23, 2009 ("the '821 patent"). In particular, the '821 patent discloses a pavement recycling machine for breaking up used pavement from a surface, mixing the broken-up pavement with other materials, and reapplying the mixture to the surface. The machine includes a frame that supports an engine for powering a hydraulic system. The hydraulic system drives traction devices for moving the machine and rotary mill heads for breaking up pavement on the surface of a roadway. The broken-up pavement may be mixed with rejuvenation materials and/or supplementary aggregate materials before being dispensed via an outlet onto the surface of the roadway, leveled, and tamped. A closed loop control system having a number of sensors monitors and controls operating parameters of the machine based on parameter set points and feedback signals from the sensors. The sensors generate signals indicative of the machine position, machine speed, position and rotational speed of the rotary mill heads, pavement temperature, rejuvenation material temperature, and screed settings.

While the system of the '821 patent may allow for some coordination of milling and paving processes, it may not be applicable to resurfacing operations having separate milling and paving machines and where fresh asphalt is prepared at a location away from the jobsite.

The control system of the present disclosure solves one or more of the problems set forth above and/or other problems in the art.

SUMMARY

In one aspect, the present disclosure is related to a system for coordinating a cold planer and a paver. The system may include a first sensor configured to generate a first signal indicative of a position of the cold planer, a production monitoring system associated with the cold planer and configured to determine a milling rate of the cold planer, a communication device configured to exchange information between the cold planer and the paver, and a controller in electronic communication with the first sensor, the production monitoring system, and the communication device. The controller may be configured to receive, via the communication device, a second signal indicative of a position of the paver and a third signal indicative of a paving rate of the paver. The controller may also be configured to determine a current distance between the cold planer and the paver based on the first and second signals, determine a target distance between the cold planer and the paver based on the current distance and a comparison of the milling rate and the paving rate, and determine a difference between the target distance and the current distance.

In another aspect, the present disclosure is related to a method of coordinating a cold planer and a paver. The method may include receiving a first signal indicative of a position of the cold planer, determining a milling rate of the cold planer via a production monitoring system associated with the cold planer, and receiving, via a communication device, a first signal indicative of a position of the paver and a second signal indicative of a paving rate of the paver. The method may further include determining a current distance between the cold planer and the paver based on the position of the cold planer and the position of the paver, determining a target distance between the cold planer and the paver based on the current distance and a comparison of the milling rate and the paving rate, and determining a difference between the target distance and the current distance.

In yet another aspect, the present disclosure is directed to a cold planer. The cold planer may include a frame, a milling drum connected to the frame, a conveyor pivotally connected to the frame and configured to load milled material into a receptacle, a first sensor configured to generate a first signal indicative of a position of the cold planer, a production monitoring system associated with the cold planer and configured to determine a milling rate of the cold planer, a display device positioned within an operator station of the cold planer, a communication device configured to exchange information between the cold planer and the paver, and a controller in electronic communication with the first sensor, the production monitoring system, and the communication device. The controller may be configured to receive, via the communication device, a second signal indicative of a position of the paver and a third signal indicative of a paving rate of the paver, determine a current distance between the cold planer and the paver based on the first and second signals, determine a target distance between the cold planer and the paver based on the current distance and a comparison of the milling rate and the paving rate, determine a difference between the target distance and the current distance, and generate a graphical user interface on the display device indicative of the difference between the target distance and the current distance between the cold planer and the paver.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A "cold planer" is defined as a machine used to remove layers of hardened asphalt from an existing roadway. It is contemplated that the disclosed cold planer may also or alternatively be used to remove cement and other roadway surfaces, or to remove non-roadway surface material such as in a mining operation.

Figure 1:
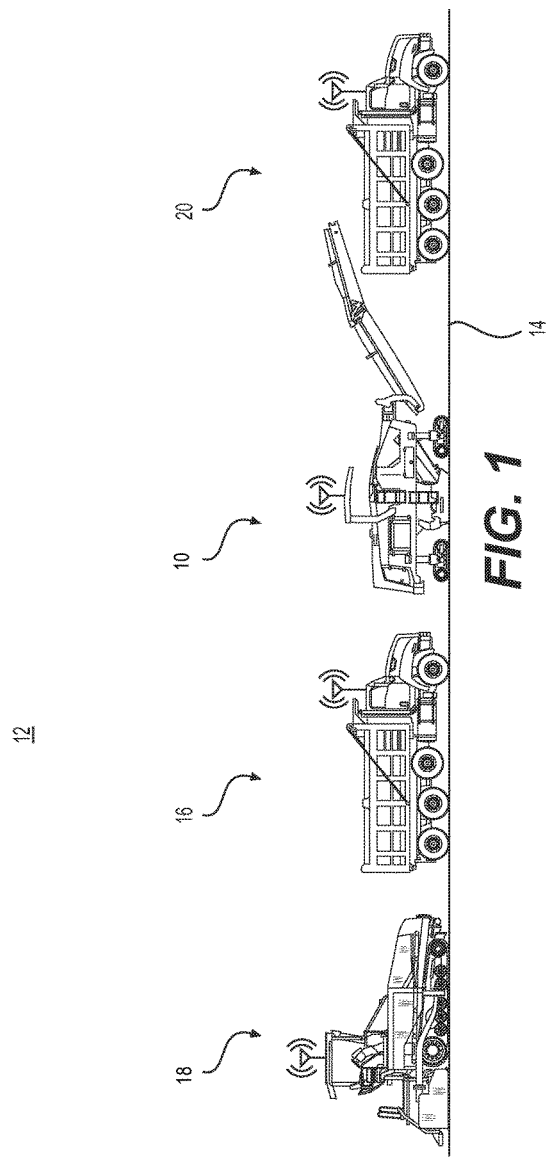
FIG. 1 is a pictorial illustration of an exemplary jobsite of a resurfacing operation having an exemplary disclosed cold planer and a paving machine.

FIG. 1 shows a cold planer 10 employed at a worksite 12, such as, for example, a roadway resurfacing operation. As part of the resurfacing operation, cold planer 10 may mill a surface 14 of the roadway and transfer milled material into one or more first haul trucks 16 (only one shown). When full, haul trucks 16 may depart from cold planer 10 to deliver the milled material to a storage site (not shown), and an empty haul truck 16 may approach cold planer 10 to replace a full haul truck 16 to allow for a continuous milling process.

A paving machine ("paver") 18 may follow behind cold planer 10 and deposit a layer of paving material, such as fresh asphalt, onto surface 14 after it has been milled by cold planer 10. One or more second haul trucks 20 (only one shown) may periodically pass between paver 18 and cold planer 10 to deliver additional fresh asphalt to paver 18 to allow for a continuous paving process. Additional haul trucks 20 containing fresh asphalt may be summoned from an asphalt plant (not shown) or dispatch facility when it is determined that additional asphalt is needed.

Figure 2:
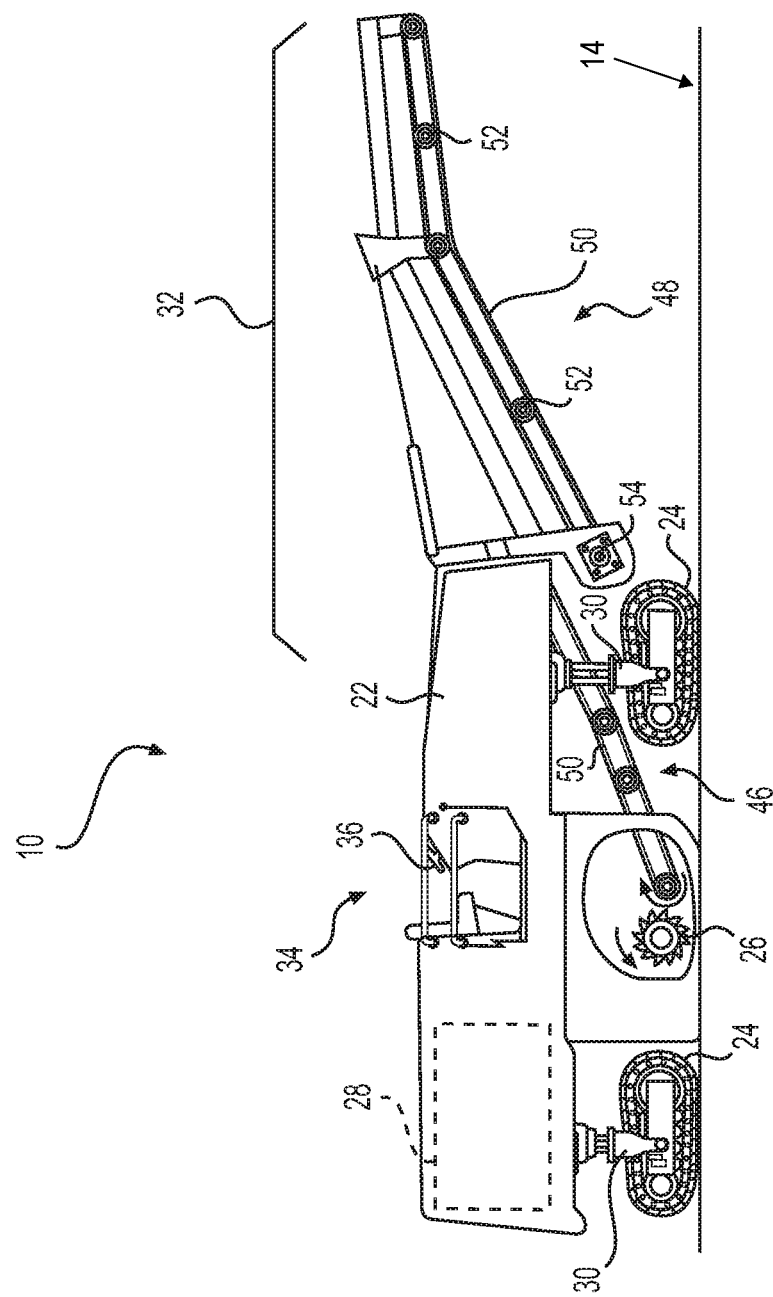
FIG. 2 is a cutaway view illustration of the cold planer of FIG. 1.

FIG. 2 illustrates an exemplary cold planer 10 having a frame 22 supported by one or more traction devices 24, a milling drum 26 rotationally supported under a belly of frame 22, and an engine 28 mounted to frame 22 and configured to drive milling drum 26 and traction devices 24. Traction devices 24 may include either wheels or tracks connected to actuators 30 that are adapted to controllably raise and lower frame 22 relative to surface 14. It should be noted that, in the disclosed embodiment, raising and lowering of frame 22 may also function to vary a milling depth of milling drum 26 into surface 14. In some embodiments, the same or different actuators 30 may also be used to steer cold planer 10 and or to adjust a travel speed of traction devices 24 (e.g., to speed up or brake traction devices 24), if desired.

A conveyor system 32 may be pivotally connected at a leading end to frame 22 and configured to transport material away from milling drum 26 and into a receptacle, such as a haul truck 16 (referring to FIG. 1). Other types of receptacles may be used, if desired.

Frame 22 may also support an operator station 34. Operator station 34 may house any number of interface devices 36 used to control cold planer 10. In the disclosed example, interface devices 36 may include, among other things, a display 38, a warning device 40, and an input device 42 (38-42 shown only in FIG. 3). In other embodiments, operator station 34 may be off-board cold planer 10. For example, operator station 34 may embody a remote control, such as a handheld controller, a cellular phone, a tablet, a laptop computer, or any other type of mobile device that an operator may use to control cold planer 10 from anywhere on or away from worksite 12. Operator station 34 may alternatively embody a software program and a user interface for a computer, and may include a combination of hardware and software. In other embodiments, cold planer 10 may be autonomous and may not include operator station 34.

Figure 3:
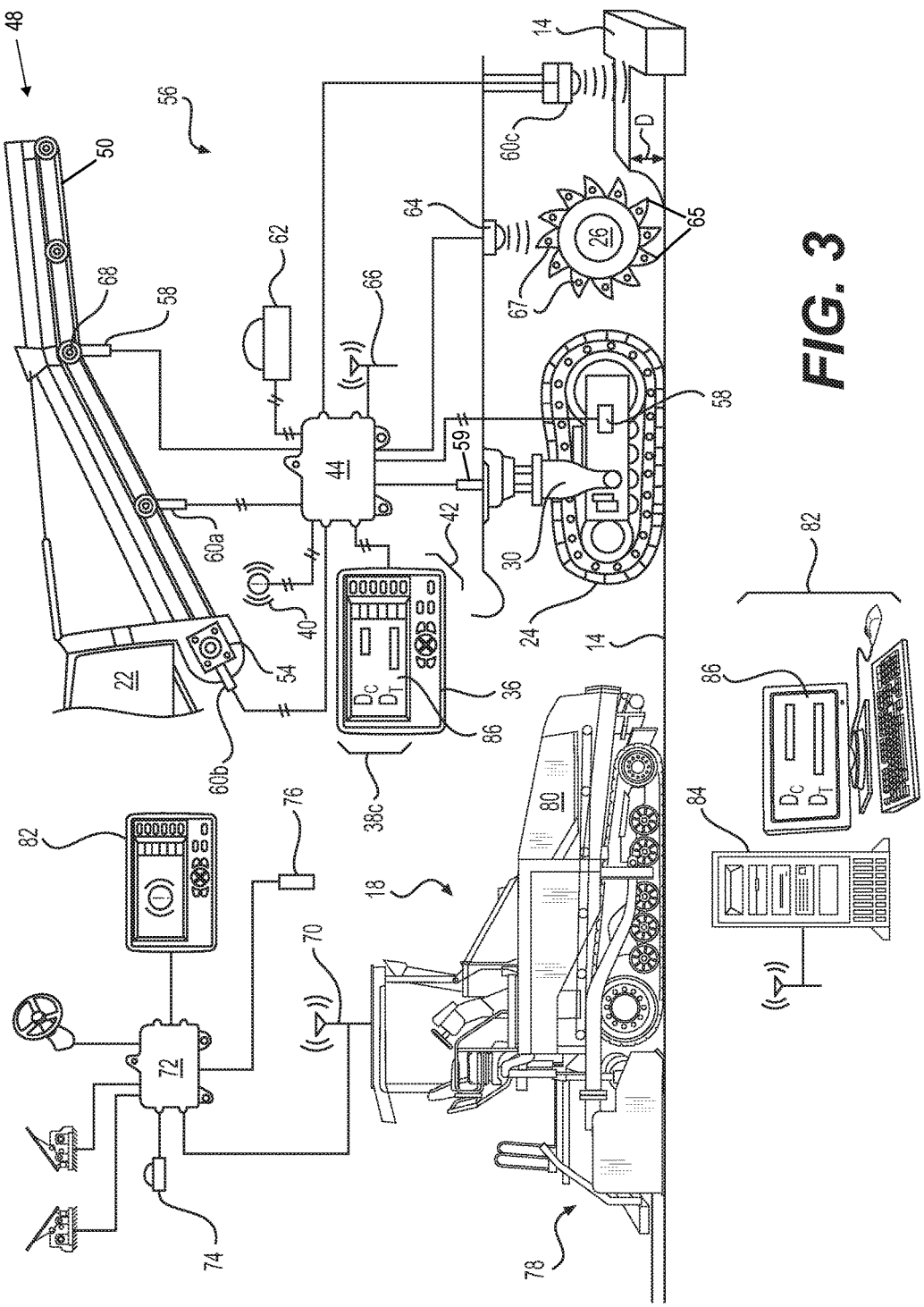
FIG. 3 is a diagrammatic illustration of an exemplary disclosed system a may be used to coordinate operations of the cold planer and paving machine of FIG. 1.

Referring to FIG. 3, display 38 may be configured to render the location of cold planer 10 (e.g., of milling drum 26) relative to features of the jobsite (e.g., milled and/or unmilled parts of surface 14), and to display data and/or other information to the operator. Warning device 40 may be configured to audibly and/or visually alert the operator of cold planer 10 as to a proximity of milling drum 26 to the worksite features, and/or when certain pieces of data exceed an associated threshold. Input device 42 may be configured to receive data and/or control instructions from the operator of cold planer 10. Other interface devices (e.g., control devices) may also be possible, and one or more of the interface devices described above could be combined into a single interface device, if desired.

Input device 42 may be, for example, an analog input device that receives control instructions via one or more buttons, switches, dials, levers, etc. Input device 42 may also or alternatively include digital components, such as one or more soft keys, touch screens, and/or visual displays. Input device 42 may be configured to generate one or more signals indicative of various parameters associated with cold planer 10 and/or its surrounding environment based on input received from the operator.

Referring again to FIG. 2, conveyor system 32 may include a first conveyor 46 adjacent milling drum 26 that is configured to transfer milled material to a second conveyor 48. Conveyor 48 may be pivotally attached to frame 22 so that the height at which milled material leaves conveyor 48 can be adjusted. That is, a pivotal orientation of conveyor 48 in the vertical direction may be adjusted to raise and lower conveyor 48. Conveyor 48 may also be pivotally attached to frame 22 so that the lateral location at which milled material leaves conveyor 48 may be adjusted. That is, a pivotal orientation of conveyor 48 in the horizontal direction may be adjusted to move conveyor 48 from side to side.

Conveyors 46 and 48 may each include a belt 50 that is supported on a plurality of roller assemblies 52 and driven by a motor 54. Motor 54 may embody, for example, a hydraulic motor 54 powered by a hydraulic system (not shown). In other embodiments, motor 54 may be an electric motor or another type of motor. Motor 54 may be powered by engine 28 or by another power source.

As illustrated in FIG. 3, a control system 56 may be associated with cold planer 10 and include elements that cooperate to monitor and analyze the transfer of milled material into haul truck 16 and facilitate communication between cold planer 10 and paver 18 and/or between cold planer 10 and haul trucks 16, 20. For example, elements of control system 56 may cooperate to determine a milling rate of cold planer 10. The milling rate of cold planer 10 may be a mass flow rate $\dot{m}$ and/or a volume flow rate $\dot{V}$ of milled material being discharged by cold planer 10 into haul truck 16. The milling rate may be determined with respect to time, distance, or another reference parameter, as desired. Control system 56 may also be configured to determine a total amount (e.g., a total weight W or total volume V) of material that has been milled and/or transferred over a period of milling time, a fill level $\Sigma$ of haul truck 16, an amount of remaining time $T_F$ until haul truck 16 is full, and/or other statistical information.

Elements of control system 56 may include interface devices 36, a speed sensor 58, a depth sensor 59, one or more material measurement sensors 60a-c ("sensors"), a locating device 62, a bit wear sensor 64, a communication device 66, and a controller 44 electronically connected with each of the other elements. Elements of control system 56 may be configured to generate signals indicative of operating parameters associated with cold planer 10 that may be used by controller 44 for further processing. Information, including the mass flow rate $\dot{m}$, volume flow rate $\dot{V}$, total weight W, total volume V, fill level $\Sigma$, and remaining time $T_F$ may be shown to the operator of cold planer 10 via display 38 and used by the operator and/or controller 44 to regulate operating parameters of cold planer 10 (e.g., travel speed, drum rotational speed, milling depth, milling rate, etc.) and/or to dispatch haul trucks 16, 20. This information and/or other data may be sent off-board cold planer 10 via communication device 66 for use by operators of paver 18 or haul trucks 16, 20, jobsite management, and/or for back office analysis.

Controller 44 may be configured to determine the fill level $\Sigma$ of haul truck 16 based on the mass flow rate $\dot{m}$, volume flow rate $\dot{V}$, and/or the total weight W or volume V of the milled material in conjunction with known features of haul truck 16 (e.g., geometry, volumetric capacity, shape, tare weight, weight limit, etc.). Using this information and the signals from one or more of sensors 60a-c, controller 44 may be configured to determine the remaining time $T_F$ until haul truck 16 is full (i.e., reaches a threshold, reaches a desired fill level, etc.). For example, controller 44 may compare the mass flow rate $\dot{m}$, volume flow rate $\dot{V}$, total weight W, and/or fill level $\Sigma$ to a weight limit, volumetric capacity, and/or target fill level of haul truck 16 over a period of conveying time, and determine how much time remains until transport vehicle will become full. This information may be used to determine when to dispatch empty haul trucks 16 to cold planer 10 or full haul trucks 20 carrying fresh paving material to paver 18.

Speed sensor 58 may be configured to generate a signal indicative of a linear belt speed of belt 50. For example, speed sensor 58 may be a shaft-driven sensor that is attached to a pulley 68 of conveyor system 32. Pulley 68 may be in contact with belt 50 and may be driven by motor 54 (referring to FIG. 2). Pulley 68 may alternatively be a free-wheeling pulley, such as an idler, tensioner, or other type of pulley. Speed sensor 58 may alternatively be attached directly to a shaft of motor 54, and its signal may also be indicative of the speed of motor 54. In some embodiments, multiple speed sensors 58 may be utilized and their outputs processed by controller 44 in order to reduce inaccuracies caused by slipping of belt 50. Speed sensor 58 may detect the speed of a shaft or wheel using magnetic, optical, pulsating, or other type of sensing element. Signals generated by speed sensor 58 may be communicated to controller 44 and used for further processing.

Depth sensor 59 may be configured to generate a signal indicative of a depth D of milling drum 26 below surface 14. That is, depth sensor 59 may generate a signal indicative of the cutting depth of cold planer 10. In some embodiments, depth sensor 59 may be associated with actuators 30 and configured to generate a signal that may be used by controller 44 to determine the depth D based on the position of actuators 30 in conjunction with known information (e.g., known offsets between frame 22 and milling drum 26). In other embodiments, depth sensor 59 may be configured to generate a signal indicative of a relative position of milling drum 26 with respect to frame 22 or another reference component of cold planer 10.

Sensors 60a-c may include one or more sensors and/or systems of sensors configured to generate signals indicative of an amount of material being milled and/or transferred into haul truck 16 via conveyor 48. For example, sensor 60a may be a belt scale. That is, sensor 60a may include a force transducer that is configured to measure a normal force applied to belt 50 by the weight of material on conveyor 48. The signal generated by sensor 60a may be utilized by controller 44 in conjunction with the signal generated by speed sensor 58 and/or other sensors (e.g., an inclinometer) to determine the mass flow rate $\dot{m}$ and/or a volume flow rate $\dot{V}$ of milled material being transferred into haul truck 16.

Sensor 60b may be configured to generate a signal indicative of an operating parameter that can be used to determine how much power is used to drive conveyor 48. For example, sensor 60b may be configured to measure a hydraulic pressure differential, an electrical voltage, or another parameter of motor 54. The signal generated by sensor 60b may be utilized by controller 44 in conjunction with other parameters (e.g., hydraulic fluid flow rate, motor speed, motor displacement, electrical resistance, electrical current, etc.) to determine the power used to drive conveyor 48. The power used to drive conveyor 48, along with other parameters (e.g., the size and speed of pulley 68, angle of inclination of conveyor 48, etc.) may be utilized by controller 44 to determine the milling rate (e.g., mass flow rate $\dot{m}$ and/or a volume flow rate $\dot{V}$) of cold planer 10.

Sensor 60c may embody a sensor or system that is configured to determine the amount of material being transferred by conveyor 48 without contacting any moving parts of conveyor 48. For example, sensor 60c may include a radioactive detection system, a laser scanning system, an optical scanner, a camera, an ultrasonic sensor, or another type of sensor that is configured to generate a signal indicative of a length (e.g., a width, a height, a depth, etc.), an area, or a volume of material milled by milling drum 26. Other types of sensors or sensing systems may be used, if desired. Signals generated by sensors 60a-c may be utilized by controller 44 in conjunction with other parameters (e.g., belt speed) to determine the milling rate of cold planer 10 (e.g., mass flow rate $\dot{m}$ and/or a volume flow rate $\dot{V}$ of milled material).

Locating device 62 may be configured to generate a signal indicative of a geographical position of the cold planer 10 relative to a local reference point, a coordinate system associated with the work area, a coordinate system associated with Earth, or any other type of 2-D or 3-D coordinate system. For example, locating device 62 may embody an electronic receiver configured to communicate with one or more satellites, or a local radio or laser transmitting system used to determine a relative geographical location of itself. Locating device 62 may receive and analyze high-frequency, low-power radio or laser signals from multiple locations to triangulate a relative 3-D geographical position. A signal indicative of this geographical position may then be communicated from locating device 62 to controller 44.

Bit wear sensor 64 may be configured to detect when one or more cutting bits 65 attached to milling drum 26 exceed a wear threshold. Cutting bits 65 may be configured to emit at least one signal via one or more transmitters 67 disposed within each cutting bit 65. Transmitters 67 may be sacrificial components disposed within cutting bit 65 at a depth below an outer surface such that transmitters 67 remain intact and emit a signal until cutting bit 65 becomes worn (i.e., wears beyond the threshold). When cutting bit 65 exceeds the wear threshold, transmitters 67 may become exposed. Once exposed, transmitters 67 may be destroyed and stop emitting signals or fall out of cutting bit 65. Each transmitter 67 may be, for example, a radio frequency identification (RFID) tag that emits a signal indicative of an ID. Bit wear sensor 64 may be configured to detect the signal emitted by each transmitter and communicate the signals to controller 44. Transmitter 67 may be another type of transmitter capable of generating a signal from within cutting bit 65, if desired.

Communication device 66 may include hardware and/or software that enables sending and receiving of data messages between controller 44 and an off-board entity. The data messages may be sent and received via a direct data link and/or a wireless communication link, as desired. The direct data link may include an Ethernet connection, a connected area network (CAN), or another data link known in the art. The wireless communications may include one or more of satellite, cellular, Bluetooth, WiFi, infrared, and any other type of wireless communications that enables communication device 66 to exchange information.

Communication device 66 may be configured to communicate with paver 18 via a communication device 70 electronically connected to a controller 72 of paver 18. In this way, controller 44 of cold planer 10 may be configured to receive inputs and other information from controller 72 of paver 18. Such inputs may include, for example, one or more signals indicative of a position of paver 18, a paving rate of paver 18, an amount of available paving material for use by paver 18, an amount of available paving time, and or other information relating to the paving process being carried out by paver 18. For instance, paver 18 may include a locating device 74 configured to generate a signal indicative of the position of paver 18. The signal generated by locating device 74 may be indicative of an absolute position (e.g., a GPS coordinate location) or a relative distance (e.g., based on a laser-, an ultrasonic-, or a radio-based measurement system) between cold planer 10 and paver 18.

Paver 18 may also include one or more sensors 76 configured to generate signals indicative of parameters that may be used to determine the paving rate of paver 18. Sensors 76 may include, for example, position sensors associated with components of a screed 78 attached to paver 18. The signals generated by sensors 76 may be indicative of or used to determine the height of screed 78 above surface 14, the width of screed 78, and/or the angle of one or more screed plates with respect to surface 14. Based on these signals and in conjunction with other information (e.g., the groundspeed of paver 18, the density of the paving material, etc.), controller 72 or controller 44 may be configured to determine the paving rate (e.g., volumetric flow rate, mass flow rate, etc.) of paver 18. The paving rate of paver 18 may be an amount of paving material (e.g., a weight, a mass, a volume, etc.) laid down on surface 14 with respect to a reference parameter, such as time or distance.

The amount of available paving material may be an amount of paving material available within a hopper 80 of paver 18, material available within haul truck 20 (referring to FIG. 1), or material available from a paving material plant for a given period, such as a particular day, shift, or project. In some cases, the amount of available material may be transmitted to paver 18 from a communication device at the plant, which may then be transmitted to cold planer 10. In other cases, the amount of available paving material may be transmitted directly to cold planer 10.

The amount of available paving time may be determined by worksite personnel or dictated by job constraints, such as an amount of time allotted by a customer or regulatory body. For example, paving time may be limited to time between morning and evening rush hours, off-peak usage times, daylight or nighttime hours, etc. The amount of available paving time may be entered via an interface device 82 associated with paver 18, via interface device 36 of cold planer, or provided by an off-board entity, such as an off-board computer 84. Other operating parameters of paver 18, such as a ground speed, a heading, an operational status (e.g., running, stopped, malfunctioning, etc.), or other information may also be communicated from paver 18 to cold planer 10.

It is noted that any information provided to cold planer 10 via communication device 66 may alternatively be provided by off-board computer 84. For instance, any information generate by paver 18, such as the position, paving rate, and speed of paver 18, may be communicated from paver 18 to off-board computer 84, and then from off-board computer 84 to cold planer 10. Other information relating to the paving process, such as the amount of available paving time and material, the density of the paving material, jobsite plans, etc., may also or alternatively be provided to cold planer 10 directly from off-board computer 84. Off-board computer 84 may be any type of back office computer, laptop computer, cellular phone, personal digital assistant, tablet, dedicated hardware device, or other type of stationary or mobile computing device configured to communicate information via a wired or wireless connection.

Controller 44 may embody a single microprocessor or multiple microprocessors that include a means for monitoring operator and sensor input, and responsively adjusting operational characteristics of cold planer 10 based on the input. For example, controller 44 may include a memory, a secondary storage device, a clock, and a processor, such as a central processing unit or any other means for accomplishing a task consistent with the present disclosure. Numerous commercially available microprocessors can be configured to perform the functions of controller 44. It should be appreciated that controller 44 could readily embody a general machine controller capable of controlling numerous other machine functions. Various other known circuits may be associated with controller 44, including signal-conditioning circuitry, communication circuitry, and other appropriate circuitry. Controller 44 may be further communicatively coupled with an external computer system, instead of or in addition to including a computer system, as desired.

Controller 44 may be configured to help ensure that any portions of surface 14 that are milled by cold planer 10 can be paved by paver 18 within the constraints of the resurfacing operation. For instance, controller 44 may be configured to help ensure that cold planer 10 operates at a far enough distance ahead of paver 18 to allow paver 18 to operate at its desired paving rate without interruption, while also ensuring that cold planer 10 does not mill more of surface 14 than can be repaved with the time and material available for that day or that job. For example, personnel may wish to operate paver 18 at a generally constant paving rate, which may require that enough space between paver 18 and cold planer 10 be available to allow cold planer 10 to operate and perform maintenance functions, such as periodically changing worn out cutting bits 65, without slowing down paver 18. But if too great of a distance is maintained, paver 18 may not have enough paving material or time available to pave the space between it and cold planer 10.

To help control the distance between paver 18 and cold planer 10 during the resurfacing operation, controller 44 may be configured to first determine a current distance $D_C$ between cold planer 10 and paver 18. Controller 44 may determine the current distance $D_C$ based on the signals from locating devices 62 and 74. For instance, controller 44 may be configured to compute a distance between cold planer 10 and paver 18 based on their respective GPS locations. In other embodiments, cold planer 10 and paver 18 may begin the operation at a known distance apart, and controller 44 may be configured to track a difference in groundspeed between cold planer 10 and paver 18 over a period of operating time. Based on the difference, controller 44 may be configured to compute a relative distance between cold planer 10 and paver 18 as the current distance $D_C$.

Controller 44 may be configured to then determine a target distance $D_T$ between cold planer 10 and paver 18 based on the current distance $D_C$ and a comparison of the milling rate and the paving rate. For instance, when paver 18 is paving at a known rate, for example, of 200 tons per hour, while cold planer 10 is milling at a rate of 200 tons per hour, the production rates of cold planer 10 and paver 18 may be the same. But when cold planer stops to wait for an empty haul truck 16 or to undergo a maintenance procedure (e.g., cutting bit replacement, refueling, oiling, etc.), paver 18 may continue paving and reduce the distance between it and cold planer 10. The rate at which the distance between cold planer 10 and paver 18 increases or decreases may change based on the difference between the paving rate and the milling rate. That is, when the milling rate is greater than the paving rate, the distance between cold planer 10 and paver 18 may increase when both machines are operating. Conversely, when the milling rate is less than the paving rate, the distance between cold planer 10 and paver 18 may decrease when both machines are operating.

Controller 44 may track the position of cold planer 10 and paver 18 in conjunction with the milling rate and the paving rate, respectively, to determine the rate at which the current distance $D_C$ changes with respect to the difference between the milling rate and the paving rate. In this way, controller 44 may be configured to determine changes in the current distance $D_C$ when both machines are running, as well as when the operation of either cold planer 10 or paver 18 has been paused. Based on the rate of change of the current distance $D_C$ between cold planer 10 and paver 18 and on other known information, controller 44 may determine the target distance $D_T$. Other known information that may affect the determination of the target distance $D_T$ may include, for example, a desired minimum distance or minimum time gap, an amount of time required to perform a maintenance operation, an amount of time until a next empty haul truck 16 will arrive, and/or other information.

For example, controller 44 may be configured to determine the target distance $D_T$ based on one or more operating parameters of cold planer 10 that change over time and require cold planer 10 to periodically stop for maintenance, inspection, repair, or other procedures. Controller 44 may then determine an amount of remaining time $T_T$ until the operating parameters reach a threshold and determine the target distance $D_T$ based on the amount of remaining time $T_T$. For instance, as described above, cutting bits 65 may be periodically inspected and/or replaced by personnel, which requires cold planer 10 to stop milling for a period of time. To ensure that a sufficient distance between paver 18 and cold planer 10 is maintained while cold planer 10 is stopped, controller 44 may determine the target distance $D_T$ based on how much time remains until maintenance is expected to be needed and an amount of time required to inspect and/or replace cutting bits 65.

Controller 44 may be configured to determine how much time remains until maintenance is needed by tracking the signals generated by transmitters 67 that are detected by bit wear sensor 64 over time. For instance, signals detected by bit wear sensor 64 may be indicative of wear levels of cutting bits 65 that change over time, from which controller 44 can extrapolate the amount of time $T_T$ until the cutting bits 65 will be fully worn. The amount of time required to inspect and/or replace the worn cutting bits 65 may be a predetermined or estimated amount of time stored in the memory of controller 44, which may also be increased or decreased based on a number of cutting bits 65 that require inspection or replacement, as determined by the signals received from bit wear sensor 64.

Controller 44 may also or alternatively consider other operating parameters when determining the target distance $D_T$, if desired. For example, controller 44 may receive signals from other sensors associated with cold planer 10, such as a fuel level sensor, an oil level sensor, an oil pressure sensor, a coolant temperature sensor, and/or other sensors. Controller 44 may track the signals generated by one or more of these other sensors over time and extrapolate the amount of time remaining $T_T$ until those parameters reach a threshold at which maintenance procedures associated with the detected parameters are required. Such procedures may include, for example, a refueling procedure, an oiling procedure, a repair procedure, or another maintenance task. Controller 44 may also account for the required time to carry out these procedures based on known time values stored within its memory or entered by personnel via interface device 36.

After determining the current distance $D_C$ and the target distance $D_T$, controller 44 may determine a difference between the current distance $D_C$ and the target distance $D_T$ and generate a control signal based on the difference. The control signal may be configured to convey information to an operator, initiate an automated control process, or perform another type of operation. For example, in response to the control signal, controller 44 may be configured to generate a graphical user interface 86 having graphical objects that are indicative of the difference between the current distance $D_C$ and the target distance $D_T$ and show graphical user interface 86 to an operator via display 38. In this way, controller 44 may allow the operator to visualize the extent to which cold planer 10 should slow down or speed up in order to achieve the target distance $D_T$. The operator may then be able to manually adjust the speed, and thus the milling rate, of cold planer 10 as needed in order to achieve the target distance $D_T$. In some embodiments, the control signal may be directed to one or more actuators (e.g., actuators 30) to cause automatic adjustments of the speed and/or milling rate of cold planer 10 to achieve the target distance $D_T$.

Controller 44 may also be configured to determine the target distance $D_T$ and/or other information based on an amount of space on surface 14 that has been milled but is yet to be paved by paver 18. Such information may be used by controller 44 to determine how much fresh paving material and how much time (i.e., in conjunction with the known paving rate of paver 18) is needed to replace the material removed from surface 14 by cold planer 10. Controller 44 may use this information to determine and/or control the target distance $D_T$ by setting threshold distances based on how much paving work can be accomplished using the material and time allotted to the resurfacing project.

For example, controller 44 may be configured to generate a model of the space to be filled by paver 18 based on the depth D of milling drum 26, a width of the milling drum, and the position of cold planer 10 over a period of milling time. That is, controller 44 may continually track the depth D of milling drum 26 and multiply the depth D by the width of milling drum 26, which may be a known value stored within memory, to continually determine a cut area of milling drum 26. The cut area may be multiplied by a change in travel distance of cold planer 10, as determined by the difference between a first and a subsequent location signal generated by locating device 62, in order to determine a cut volume. Iterative calculations of the cut volume may be performed over a period of milling time and compiled with respect to the location of cold planer 10 to generate a volumetric model of the space milled by cold planer 10, which is to be filled by paver 18. The model may be indicative of the total volume of space to be paved and include detailed depth and width data along the length of the modeled space.

Based on the model, controller 44 may be configured to determine an amount of paving material required to fill the space to be paved by paver 18 as well as an amount of time required to do so. For instance, by multiplying the total volume of the modeled space by a known paving material density, controller 44 may be configured to determine the amount of material (e.g., by weight) required to pave the space milled by cold planer 10. Controller 44 may also be configured to divide the total amount of material required to pave the space by the paving rate of paver 18 to determine the amount of time required to pave the space milled by cold planer 10. Other ways of determining the required amount of paving material and paving time may be possible.

As discussed above, controller 44 may also receive signals via communication device 66 that are indicative of an amount of available paving material and an amount of available paving time. The amount of available paving material and available paving time may be actual or imposed limitations on material and time for a given period, such as a particular shift, day, or job. Using this information, controller 44 may be configured to then determine a difference between the amount of required paving material and the amount of available paving material, as well as a difference between the required paving time and the available paving time. Controller 44 may then generate a control signal based on one or more of these differences to ensure the target distance $D_T$ is maintained and/or to ensure that surface 14 is milled only to the extent that it can be repaved in the time available.

For example, controller 44 may track the total amount of material milled by cold planer 10 over a period of milling time using the model, as described above. Controller 44 may also extrapolate the rate at which the total volume of milled material has accumulated to determine when the total amount of milled material will reach or exceed the amount of available paving material. Based on the amount and/or rate of accumulation of milled material, controller 44 may be configured to generate a control signal for adjusting the milling rate of cold planer 10. In some embodiments, the control signal may be directed to one or more actuators (e.g., actuators 30) to cause automatic adjustments of the speed and/or milling rate of cold planer 10. For instance, when the total amount of milled material (e.g., as determined by the model) is equal to or has exceeded the amount of available paving material, the control signal may be generated by controller 44 to automatically reduce the milling rate (e.g., to zero) to prevent further milling of surface 14. Alternatively, when controller 44 determines when the amount of milled material will reach the amount of available paving material, controller 44 may generate the control signal to automatically adjust the paving rate of cold planer 10 to maintain the target distance $D_T$ until that time.

In other embodiments, controller 44 may generate the control signal in order to generate a graphical object on a display 38 that is indicative of the difference between the amount of required paving material and the amount of available paving material. The graphical object may include any type of graphical features configured to convey the difference between the amounts of required and available paving material in a quantitative or qualitative fashion, such as numbers, bars, dials, color scales, etc. In this way, the operator may be allowed to manually control the paving rate of cold planer 10 while visualizing how any adjustments made to cold planer 10 affect the amount and/or rate of material accumulation with respect to the amount of available paving material. The graphical object may also or alternatively be configured to convey the difference between the current distance $D_C$ and the target distance $D_T$ based on the amount and/or rate of accumulation of milled material to allow the operator to manually control the current distance $D_C$ so as not to exceed a point at which paver 18 will not be able to repave all of the space milled by cold planer 10.

Similarly, based on the difference between the amount of required paving time and the amount of available paving time, controller 44 may be configured to generate a control signal to cause automatic adjustments of the milling rate of cold planer 10. For example, when controller 44 determines that the required paving time is equal to or has exceeded the amount of available paving time, the command signal generated by controller 44 may automatically reduce the milling rate of the cold planer (e.g., to zero) to prevent further milling of surface 14. Alternatively, when controller 44 determines when the amount of required paving time will not exceed the amount of available paving time, controller 44 may generate the control signal to automatically adjust the paving rate of cold planer 10 to maintain the target distance $D_T$ until the desired amount of material has been milled.

In other embodiments, controller 44 may generate the control signal in order to generate a graphical object on a display 38 that is indicative of the difference between the amount of required paving time and the amount of available paving time. The graphical object may include any type of graphical features configured to convey the difference between the amounts of required and available paving tune in a quantitative or qualitative fashion, such as numbers, bars, dials, color scales, etc. In this way, the operator may be allowed to manually control the paving rate of cold planer 10 while visualizing how any adjustments made to cold planer 10 affect the amount of required paving time with respect to the amount of available paving time. The graphical object may also or alternatively be configured to convey the difference between the current distance $D_C$ and the target distance $D_T$ based on the difference between required and available paving time to allow the operator to manually control the current distance $D_C$ so as not to exceed a point at which paver 18 will not be able to repave all of the space milled by cold planer 10 in the time available.

INDUSTRIAL APPLICABILITY

The disclosed control system may be used with any cold planer where maintaining a desired or optimum distance ahead of a paving machine during a resurfacing operation is important. A controller within the system may receive signals indicative of the positions and production rates of the cold planer and the paving machine and determine a target distance to be maintained based on comparisons of the their locations and their production rates. The controller may also determine the amount of paving material and paving time required to pave the space milled by cold planer 10 based on the production rates of the cold planer and the paver. Using this information, the controller may generate a model of the space milled by the cold planer, and generate control signals for controlling the milling rate of cold planer 10 and the distance between the paver and cold planer based on the model. The control signals may cause automatic adjustments of the milling rate of the cold planer and/or the creation of graphical objects on graphical user interface 86 configured to convey visual indications of a difference between the current distance and the target distance, or respective differences between the required and available amounts of paving time and material. An exemplary operation of control system 56 will now be explained.

At the beginning of a resurfacing operation, cold planer 10 may start by milling a stretch of surface 14 at a desired milling rate before paver 18 begins repaving the milled surface. Once cold planer 10 is a desired distance ahead of paver 18, paver 18 may being paving at a desired paving rate. The milling and paving rates of cold planer 10 and paver 18, respectively, may be measured in an amount of material per unit of time, such as in tons of per hour. Other production rates based on weight or volume per unit of time or distance may alternatively be used, as desired.

While cold planer 10 and paver 18 are operating at their respective production rates, controller 44 may receive signals from locating devices 62, 74 that are indicative of the locations of cold planer 10 and paver 18, respectively. Controller 44 may compare the signals from locating devices 62, 74 and determine the current distance $D_C$ between cold planer 10 and paver 18. Controller 44 may store the current distance $D_C$ within its memory for further processing.

Controller 44 may then determine the milling rate of cold planer 10 based on signals from sensors 58 and one or more of sensors 60*a-c*, and receive a signal indicative of the paving rate of paver 18 from controller 72 via communication device 66. After comparing the milling rate and the paving rate, controller 44 may determine how quickly paver 18 and cold planer 10 are nearing each other or diverging at the current distance $D_C$ in terms of the space between them and/or a difference in their total production (i.e., the total amount of material milled versus the total amount of fresh paving material deposited). Controller 44 may simultaneously receive maintenance signals from other sensors, such as bit wear sensor 64, and determine how much time remains until cold planer 10 may need to be stopped to receive maintenance based on the signals. These maintenance signals may also include information, such as an amount of time cold planer 10 is expected to wait for an empty haul truck 16 to reach worksite 12 before cold planer 10 can continue milling surface 14.

Based on the current distance $D_C$, the difference between the milling and paving rates, and/or the expected future delays of cold planer 10, controller 44 may then determine the target distance $D_T$ that should separate cold planer 10 and paver 18 to ensure that paver 18 will not catch up to cold planer 10 during the resurfacing operation. After determining the target distance $D_T$, controller 44 may compare the current distance $D_C$ to the target distance $D_T$ and then generate command signals based on the difference. For example, when the current distance $D_C$ and target distance $D_T$ are not equal, controller 44 may send command signals to one or more actuators associated with cold planer 10 based on the difference to automatically adjust the milling rate of cold planer 10 to bring the current distance $D_C$ nearer to or equal to the target distance $D_T$. In this way, the target distance $D_T$ between cold planer 10 and paver 18 may be easily achieved and/or maintained.

Alternatively, controller 44 may generate control signals that cause graphical objects to be displayed on display 38 that are indicative of the difference between the current distance $D_C$ and the target distance $D_T$. The graphical objects may allow the operator of cold planer 10 to quickly and easily visualize the how adjustments to the operation of cold planer 10, such as groundspeed adjustments, affect the difference between the current distance $D_C$ and the target distance $D_T$. This may allow operators to control cold planer 10 with greater accuracy and with independence from spotters, surveyors, and/or other personnel.

As cold planer 10 mills surface 14, controller 44 may also constantly track the depth and width of milling drum 26 and generate a model of the milled space over the distance traveled by cold planer 10 during the milling operation. The model may be a 3-D model that accurately accounts for the volume of space to be filled in by paver 18. In this way, surveyors may be relieved of the duty of constantly determining the progress of cold planer 10 during the resurfacing operation.

Controller 44 may also use the model of the milled space in conjunction with other known information (e.g., the density of the fresh paving material) to determine whether the amount of paving material required to fill in the milled space exceeds the amount of available paving material. For example, controller 44 may receive a signal indicative of the amount of available paving material from a material production plant, off-board computer 84, or paver 18 via communication device 66, and determine whether the amount of available paving material is sufficient to fill in the volume of space milled by cold planer 10. When the amount of available paving material is insufficient, controller may automatically reduce the milling rate of cold planer 10, or generate graphical objects on display 38 that are indicative of the difference between the amount of required paving material and the amount of available paving material. In this way, controller 44 may automatically or the operator may be assisted to manually prevent more material from being milled than can be replaced.

Controller 44 may also use the model of the milled space in conjunction with other known information (e.g., the paving rate of paver 18) to determine whether the amount of time required to fill in the milled space exceeds the amount of available paving time. For example, controller 44 may receive a signal indicative of the amount of available paving time from a worksite supervisor, off-board computer 84, or paver 18 via communication device 66, and determine whether the amount of available paving time is sufficient to fill in the volume of space milled by cold planer 10. When the amount of available paving time is insufficient, controller may automatically reduce the milling rate cold planer 10, or generate graphical objects on display 38 that are indicative of the difference between the amount of required paving time and the amount of available paving time. In this way, controller 44 may automatically or the operator may be assisted to manually prevent more material from being milled than can be replaced in the time available.

Several advantages may be associated with the disclosed control system. For example, because controller 44 may determine the target distance $D_T$ to be maintained based on comparisons of the locations and production rates of cold planer 10 and paver 18, paving delays caused by milling delays that lead to the cooling of fresh paving material below a suitable temperature may be reduced or eliminated. Further, because controller 44 may also generate a model of the space milled by the cold planer, control signals for controlling the milling rate of cold planer 10 and the distance between paver 18 and cold planer 10 at the target distance $D_T$ may be generated. In this way, the production rates of paver 18 and cold planer 10 and the distance between them may be maintained at optimum levels during the resurfacing operation without milling more of surface 14 than can be repaved with the available paving time and material.

It will be apparent to those skilled in the art that various modifications and variations can be made to the disclosed control system without departing from the scope of the disclosure. Other embodiments of the control system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A system for coordinating a cold planer and a paver, comprising:
   a first sensor configured to generate a first signal indicative of a position of the cold planer;
   a production monitoring system associated with the cold planer and configured to determine a milling rate of the cold planer;
   a communication device configured to exchange information between the cold planer and the paver; and
   a controller in electronic communication with the first sensor, the production monitoring system, and the communication device, the controller being configured to:
   receive, via the communication device, a second signal indicative of a position of the paver and a third signal indicative of a paving rate of the paver;
   determine a current distance between the cold planer and the paver based on the first and second signals;
   determine a target distance between the cold planer and the paver based on the current distance and a comparison of the milling rate and the paving rate; and
   determine a difference between the target distance and the current distance.

2. The system of claim 1, wherein:
   the system further includes a display device; and
   the controller is configured to generate a graphical user interface on the display device, the graphical user interface being indicative of the difference between the target distance and the current distance between the cold planer and the paver.

3. The system of claim 2, wherein the display device is located on the cold planer, the paver, and an off-board computer.

4. The system of claim 1, wherein:
   the system further includes a second sensor associated with the cold planer and configured to generate a fourth signal indicative of an operating parameter associated with the cold planer; and
   the controller is configured to determine the target distance based further on the fourth signal.

5. The system of claim 4, wherein the controller is configured to:
   determine an amount of remaining time until the operating parameter reaches a threshold based on the fourth signal; and
   determine the target distance based on the amount of remaining time.

6. The system of claim 5, wherein the second sensor is a bit wear indicator associated with a cutting bit on a milling drum of the cold planer.

7. The system of claim 1, wherein:
   the production monitoring system includes a depth sensor configured to generate a signal indicative of a depth of a milling drum associated with the cold planer below a surface to be milled; and
   the controller is configured to generate a model of a space to be filled by the paver based on the depth of the milling drum, a width of the milling drum, and the position of the cold planer over a period of milling time.

8. The system of claim 7, wherein the controller is configured to:
   determine an amount of paving material required to fill the space to be filled by the paver based on the model;
   receive a signal indicative of an amount of available paving material via the communication device; and
   determine a difference between the amount of required paving material and the amount of available paving material.

9. The system of claim 8, wherein the controller is configured to generate a control signal based on the difference between the amount of required paving material and the amount of available paving material, the control signal being indicative of a command to:
   automatically reduce the milling rate of the cold planer; or
   generate a graphical object on a display device indicative of the difference between the amount of required paving material and the amount of available paving material.

10. The system of claim 7, wherein the controller is configured to:
    determine an amount of required paving time to fill the space based on the model and the paving rate of the paver;
    receive a signal indicative of an amount of available paving time via the communication device; and
    determine a difference between the amount of required paving time and the available paving time.

11. The system of claim 10, wherein the controller is configured to generate a control signal based on the difference between the amount of required paving time and the amount of available paving time, the control signal being indicative of a command to:
    automatically reduce the milling rate of the cold planer; or
    generate a graphical object on a display device indicative of the difference between the amount of required paving time and the amount of available paving time.

12. A method of coordinating a cold planer and a paver, comprising:

receiving a first signal indicative of a position of the cold planer;

determining a milling rate of the cold planer via a production monitoring system associated with the cold planer;

receiving, via a communication device, a first signal indicative of a position of the paver and a second signal indicative of a paving rate of the paver;

determining a current distance between the cold planer and the paver based on the position of the cold planer and the position of the paver;

determining a target distance between the cold planer and the paver based on the current distance and a comparison of the milling rate and the paving rate; and determining a difference between the target distance and the current distance.

13. The method of claim 12, further including generating a graphical user interface on a display device, the graphical user interface being indicative of the difference between the target distance and the current distance between the cold planer and the paver.

14. The method of claim 12, further including:
receiving a fourth signal indicative of an operating parameter associated with the cold planer; and
determining the target distance based further on the fourth signal.

15. The method of claim 14, wherein the fourth signal is a signal indicative of a wear level of a cutting bit associated with a milling drum of the cold planer.

16. The method of claim 14, further including:
determining an amount of remaining time until the operating parameter reaches a threshold based on the fourth signal; and
determining the target distance based on the amount of remaining time.

17. The method of claim 12, further including:
receiving a signal indicative of a depth of a milling drum associated with the cold planer; and
generating a model of a space to be filled by the paver based on the depth of the milling drum, a width of the milling drum, and the position of the cold planer over a period of milling time.

18. The method of claim 17, further including:
determine an amount of paving material required to fill the space to be filled by the paver based on the model;
receiving a signal indicative of an amount of available paving material via the communication device;
determining a difference between the amount of required paving material and the amount of available paving material; and
generating a control signal based on the difference between the amount of required paving material and the amount of available paving material, the control signal being indicative of a command to:
automatically reduce the milling rate of the cold planer; or
generate a graphical object on a display device indicative of the difference between the amount of required paving material and the amount of available paving material.

19. The method of claim 17, further including:
determining an amount of required paving time to fill the space based on the model and the paving rate of the paver;
receiving a signal indicative of an amount of available paving time via the communication device;
determining a difference between the amount of required paving time and the available paving time; and
generating a control signal based on the difference between the amount of required paving time and the amount of available paving time, the control signal being indicative of a command to:
automatically reduce the milling rate of the cold planer; or
generate a graphical object on a display device indicative of the difference between the amount of required paving time and the amount of available paving time.

20. A cold planer, comprising:
a frame;
a milling drum connected to the frame;
a conveyor pivotally connected to the frame and configured to load milled material into a receptacle;
a first sensor configured to generate a first signal indicative of a position of the cold planer;
a production monitoring system associated with the cold planer and configured to determine a milling rate of the cold planer;
a display device positioned within an operator station of the cold planer;
a communication device configured to exchange information between the cold planer and a paver; and
a controller in electronic communication with the first sensor, the production monitoring system, and the communication device, the controller being configured to:
receive, via the communication device, a second signal indicative of a position of the paver and a third signal indicative of a paving rate of the paver;
determine a current distance between the cold planer and the paver based on the first and second signals;
determine a target distance between the cold planer and the paver based on the current distance and a comparison of the milling rate and the paving rate;
determine a difference between the target distance and the current distance
generate a graphical user interface on the display device indicative of the difference between the target distance and the current distance between the cold planer and the paver.

* * * * *